Feb. 23, 1943. W. H. ALLEN ET AL 2,312,063
ANTILEAK VALVE ARRANGEMENT
Filed Aug. 19, 1941

Inventors:
Wayne H. Allen,
Waverly A. Reeves,
by Harry E. Dunham
Their Attorney.

UNITED STATES PATENT OFFICE 2,312,063

ANTILEAK VALVE ARRANGEMENT

Wayne H. Allen, Los Angeles, Calif., and Waverly A. Reeves, Lynn, Mass., assignors to General Electric Company, a corporation of New York Application August 19, 1941, Serial No. 407,436

8 Claims. (Cl. 184—6)

The present invention relates to anti-leak valve arrangements to prevent or reduce leakage of fluid from a tank or like source of fluid. In many instances fluid, such as lubricant contained in a tank, is removed therefrom by means of a pump and conducted to elements or devices requiring such fluid during operation. In certain cases in which both the pump and such elements or devices are located at a level below that of the tank or source of fluid it is desirable completely to disconnect the pump from the tank or source of fluid when no fluid is needed, that is, when the elements or the machine or device of which such elements form a part are shut down or when the pump is rendered inoperative. Arrangements of this kind are of particular significance when used in connection with aircraft engine or cabin superchargers operated at varying altitudes. Aircraft superchargers may include bearings, gears and like elements which require lubricant during operation. It is often necessary to mount the reservoir for lubricant above such bearings and gears and also above the pump in order that a positive head of oil relative to the pump may exist at all times.

During normal operation the anti-leak valve arrangement permits flow of lubricant from the tank through the pump to the elements requiring lubricant or like fluid during operation and when the supercharger is shut down or rendered inoperative the anti-leak valve arrangement serves to prevent leakage of lubricant from the tank to the bearings and gears or like elements.

The object of our invention is to provide an improved construction of anti-leak valve arrangements whereby leakage of oil or like fluid contained in a tank for normally supplying lubricant to bearings and the like is eliminated when the machine or device including such bearings is shut down or rendered inoperative.

For a consideration of what we believe to be novel and our invention, attention is directed to the following description and the claims appended thereto in connection with the accompanying drawing.

Figure 1:
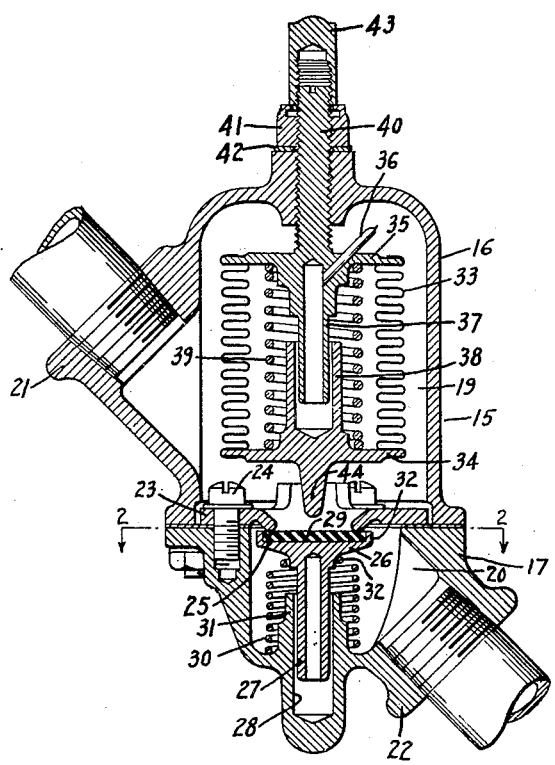
Figure 2:
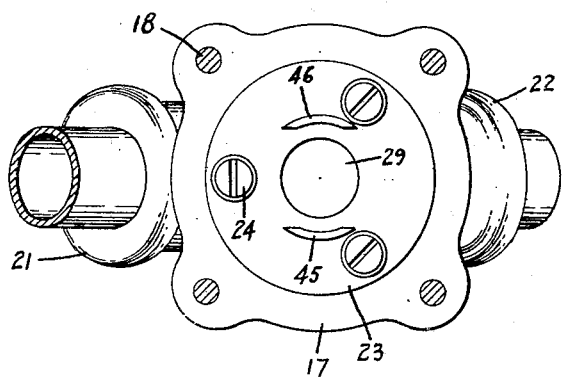

In the drawing, Fig. 1 illustrates an anti-leak valve arrangement embodying our invention; Fig. 2 is a view along line 2—2 of Fig. 1; and Fig. 3 is a diagrammatic view of a lubricating system including an anti-leak valve arrangement in accordance with our invention.

Figure 3:
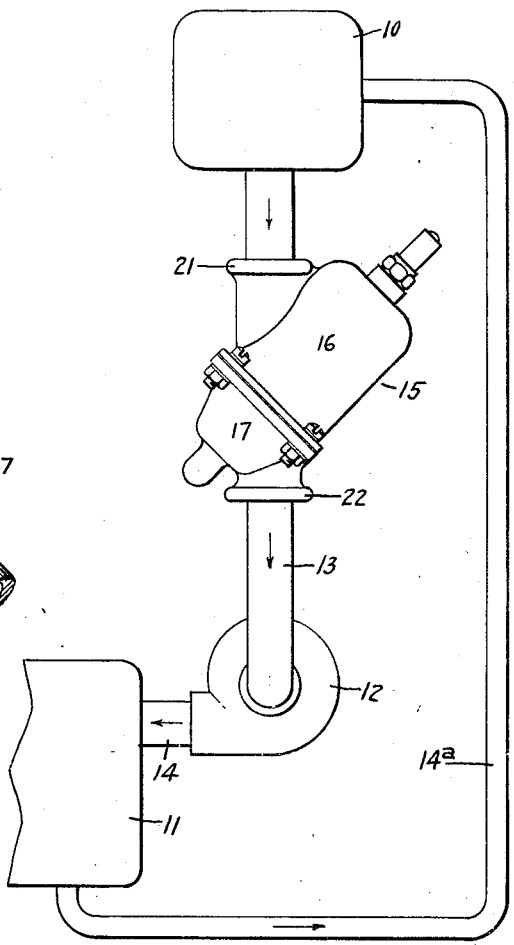

The arrangement as shown in Fig. 3 which may form part of an aircraft comprises a tank or reservoir 10 for containing oil or like lubricant or fluid for bearings or like machine parts 11 requiring lubricant or like fluid during operation. The tank or source of lubricant is connected to the element 11 by means of a pump 12 having an inlet conduit 13 connected to the tank 10 and a discharge conduit 14 connected to force lubricant to the element 11 whence the lubricant may be returned through a conduit 14a and a scavenging pump (not shown) to the tank 10. The element 11 broadly constitutes a device or consumer requiring a continuous supply of fluid during operation. The invention is especially important in connection with lubricating systems for bearings and gears of superchargers used on aircraft because considerable leakage of oil from the tank to the bearings might cause the oil to overflow from the bearings casing and become ignited by contact with the heated turbine wheel.

As indicated in the drawing, the tank 10 is located at a level above that of the pump 12 and the element 11. In order to prevent or reduce continuous leakage of lubricant from the tank 10 through the pump 12 to the element 11 while the latter is out of operation we provide in accordance with our invention an anti-leak valve arrangement 15 connected into the inlet conduit 13 of the pump 12.

The anti-leak valve arrangement as shown in Figs. 1 and 2 comprises a casing having an upper part 16 and a lower part 17 flanged together by means including a plurality of bolts 18. The two casing parts form a first chamber 19 and a second chamber 20 respectively and an inlet 21 for the first chamber and an outlet 22 for the second chamber. A ring 23 is secured to the part 17 by a number of screws 24 and has an inner downwardly projecting edge forming a valve seat 25 between the chambers 19 and 20.

A movable valve member with a disc 26 is disposed within the chamber 20 in cooperative relation with the valve seat 25. The disc is integrally formed with a stem 27 which projects loosely into and forms a clearance with a bore 28 in the lower end portion of the casing part 17.

In the preferred embodiment, as shown, the upper surface of the valve disc 26 is recessed and a washer or disc 29 of synthetic rubber or like material is held in the recess for cooperation with the valve seat 25. The valve disc or movable valve member is biased upward into engagement with the seat 25, that is into closing position, by means of a spring 30. The spring surrounds an internal cylindrical projection 31 of the casing part 17 and has an upper turn 32 considerably reduced in diameter as compared with the diameter of the other turns and connected to the lower side of the disc 26. The smaller diameter of the upper turn of the spring 30 reduces the tendency of the movable valve member to move out of alignment.

The arrangements so far described operate as follows: With the pump out of operation the valve disc 26 with its insert 29 is biased into fluid-tight engagement with the valve seat 25 by action of the biasing force of the compression spring 30. During operation of the pump 12 a vacuum or suction is created in the inlet conduit thereof and in the lower chamber 20. Assuming that the arrangement is operated on ground, that is, with atmospheric pressure or a pressure above that of the atmosphere existing in the upper chamber 19, the valve 26 is forced open due to the pressure difference between the atmospheric pressure exerted on the upper face of the valve and the suction created in the lower chamber 20. Atmospheric pressure in the chamber 19 forces the valve open against the biasing force of the spring 30.

In accordance with our invention means are provided to render the arrangement operative at high altitudes when the pressure in the upper chamber drops substantially below ground level pressure. From another viewpoint means are provided to compensate for variations in pressure or altitude in the upper chamber 19. This means includes a bellows 33 with a lower disc 34 and an upper disc 35. Prior to assembly the bellows is evacuated through a tube 36 which subsequently is sealed. The upper disc 35 has a central cylindrical projection 37 projecting into and forming a clearance with a similar central cylindrical projection 38 of the lower disc 34. The telescoping arrangement of the two projections 37, 38 maintains the lower disc 34 in alignment with the upper disc 35. In order normally to prevent collapsing of the bellows a spring 39 is disposed within the bellows engaging the lower and upper discs 34 and 35 respectively and concentrically surrounding the projections 37 and 38. The projections 37, 38 also act as stops to limit collapsing of the bellows 33.

The upper disc 35 is secured to or integrally formed with a bolt 40 threaded into a bore in the casing part 16 and securely held in position therein by means of a self-locking nut 41. In order to prevent leakage along the bolt 40 a gasket 42 is provided between the locking nut 41 and the casing part 16 and a sealing cap 43 is secured to the outer end of the bolt 40 and engages the upper end of the sealing nut 41. The lower surface of the lower disc 34 forms a central projection 44 in cooperative relation with the central portion of the valve disc 26. Downward movement of the bellows, more specifically of the lower disc 34 thereof, is limited by two stops 45 and 46 formed on diametrically opposite portions of the ring 23.

During operation at high altitude, as pointed out above, the atmospheric pressure in the upper chamber 19 in itself may be insufficient to effect opening of the valve 26 or from another viewpoint the suction created in the chamber 20 during operation of the pump 12 at high altitude does not lower the pressure in the chamber 20 sufficiently to cause opening of the valve 26 by action of the atmospheric pressure in the chamber 19 against the biasing force of the spring 30. However with increasing altitude the evacuated bellows 33 expands, its lower disc 34 moves downward until the central downward projection 44 engages the valve disc 26 and forces it open or holds it in open position. Thus, during starting on ground level the valve disc 26 is opened by action of the atmospheric pressure only in the upper chamber 19 and at a certain altitude as the atmospheric pressure in the chamber 19 has dropped to a certain low value its decreasing force on the valve 26 is compensated by the expansion of the bellows 33.

The bellows 33 may be adjusted so that with the pump out of operation it will cause opening of the valve 26 only above a certain altitude for example an altitude of 12,000 feet. With such adjustment an aircraft for example may land at any altitude below 12,000 feet. As soon as the pump is shut down the anti-leak valve 26 will close and prevent leakage of fluid from the tank 10 through the pump. The bellows, if so adjusted, will engage to open or hold open the valve at a lower altitude, of for example 5,000 feet, during operation of the pump, that is with the pump in operation at 5,000 feet the effect of the bellows together with the suction in the chamber 20 will be about the same as that of the bellows at an altitude of 12,000 feet with the pump out of operation.

The inlet 21 and the outlet 22 in the position shown in the drawing are arranged in alignment and at an angle to the center line of the valve 26 and the bellows 33. With this arrangement and in the position shown a minimum pressure drop of the fluid is caused on its passage through the anti-leak valve arrangement. With the upper and lower casing parts 16 and 17 flanged together one of the parts may be adjusted relative to the other to facilitate installation with other elements to be connected therewith. For example by turning the lower casing part 17 by 180 degrees the outlet 22 of the latter may be moved on to the same side as the inlet 21 of the casing part 16. While in such new position the inlet 21 and the outlet 22 are no longer in alignment still the pressure drop through the casing will be lower than in case the inlet and outlet were at right angles to the center line of the valve and bellows.

Having described the method of operation of our invention, together with the apparatus which we now consider to represent the best embodiment thereof, we desire to have it understood that the apparatus shown is only illustrative and that the invention may be carried out by other means.

What we claim as new and desire to secure by Letters Patent of the United States is:

1. In an aircraft, the combination of a tank for lubricant, a pump located below the tank and having an inlet conduit connected thereto for forcing liquid from the tank to a consumer located at a level below the tank, and an anti-leak valve arrangement connected into the inlet conduit of the pump to prevent leakage of liquid from the tank through the pump to such consumer upon shut down of the pump, said arrangement including a valve, means biasing the valve towards its seat and means counteracting said biasing means above a certain altitude.

2. In an aircraft, the combination of a reservoir for lubricant, an element requiring lubricant during operation and located at a level below the reservoir, and means including an anti-leak valve arrangement for normally forcing lubricant from the reservoir to the element and to prevent leakage of lubricant from the reservoir to the element when the element is put out of operation, said anti-leak valve arrangement including a valve, means biasing the valve into closed position, and means including an evacuated bellows in cooperative relation with the valve to hold the valve open at high altitude.

3. In an aircraft, the combination of an oil reservoir, a device located at a level below the reservoir, a pump having an inlet conduit connected to the reservoir and a discharge conduit connected to the device for forcing lubricant thereto during operation of the device, and an anti-leak valve arrangement connected into the inlet of the pump to prevent leakage of fluid from the reservoir to the device while the pump is out of operation, said arrangement including a casing forming a first and a second chamber with the first chamber connected to the reservoir and the second chamber connected to the inlet of the pump, a valve seat formed between the chambers, a movable valve member disposed in the second chamber in cooperative relation with and biased towards the seat, said valve member being adapted to be opened by the suction of the pump created in the second chamber during ground level operation, and means including an evacuated bellows located in the second chamber to open and to hold open the valve during operation at high altitude.

4. Anti-leak valve arrangement comprising a casing having an upper part forming a first chamber for connection to a reservoir for liquid and a lower part secured to the upper part and forming a second chamber for connection to a suction creating means, a ring secured to one of the parts and forming a valve seat between the two chambers, a movable valve member having a disc in cooperative relation with the seat, a spring biasing the movable valve member towards the seat to effect closing of the valve member while the suction creating means is out of operation, the normal atmospheric pressure in the upper chamber causing opening of the valve member upon operation of such suction creating means, and means disposed in the first chamber to compensate for substantial variations in atmospheric pressure and for effecting opening of the valve member upon a predetermined drop in atmospheric pressure.

5. Valve arrangement comprising a casing forming a first and a second chamber with an inlet for the first chamber and an outlet for the second chamber, a valve seat secured in the casing and a movable valve member disposed in the casing for controlling the flow of fluid from the first to the second chamber, a spring biasing the valve member towards the seat, and an adjustable evacuated bellows disposed within the first chamber and having one end in cooperative relation with the movable valve member to effect opening thereof in response to a predetermined drop of pressure in the first chamber.

6. In an aircraft, the combination of a reservoir, a pump located below and having an inlet conduit connected to the reservoir for forcing fluid from the reservoir to a consumer located below the reservoir, and means to prevent leakage of fluid from the reservoir upon shutdown of the pump, said means comprising a valve arrangement for the pump including a valve having a movable valve member and a seat, means biasing the valve member towards its seat and means for counteracting said biasing means upon a predetermined drop of the atmospheric pressure.

7. In an aircraft, the combination of a reservoir, a pump having an inlet conduit connected to the reservoir for forcing fluid from the reservoir to a consumer, and means to reduce leakage of fluid from the reservoir through the pump upon shutdown of the pump, said means comprising a valve arrangement including a valve having a movable valve member and a seat, means biasing the valve member towards the seat and means responsive to changes of atmospheric pressure to counteract the biasing means.

8. In an aircraft, the combination of a reservoir having a discharge conduit for conducting fluid to a consumer, and a valve arrangement in the conduit comprising a valve having a movable valve member and a seat, means biasing the valve member towards the seat and means responsive to changes of atmospheric pressure to modify the effect of the biasing means.

WAYNE H. ALLEN.
WAVERLY A. REEVES.